United States Patent [19]

Edahiro et al.

[11] 4,338,111
[45] Jul. 6, 1982

[54] PROCESS FOR PRODUCING A GLASS PREFORM FOR OPTICAL FIBER

[75] Inventors: Takao Edahiro, Mito; Michihisa Kyoto, Yokohama; Gotaro Tanaka, Yokohama; Toru Kuwahara, Yokohama, all of Japan

[73] Assignees: Nippon Telegraph & Telephone Public Corporation, Tokyo; Sumitomo Electric Industries, Ltd., Osaka, both of Japan

[21] Appl. No.: 218,226

[22] Filed: Dec. 19, 1980

[30] Foreign Application Priority Data

Dec. 20, 1979 [JP] Japan .............................. 54-164704

[51] Int. Cl.³ ........................ C03B 19/06; C03B 32/00
[52] U.S. Cl. .................................... 65/18.2; 65/3.12; 65/30.1; 65/32
[58] Field of Search .................... 65/3.12, 18.2, 30.1, 65/32

[56] References Cited

U.S. PATENT DOCUMENTS 3,868,170  2/1975  DeLuca ........................ 65/3.12 X
3,933,454  1/1976  DeLuca ........................ 65/3.12

FOREIGN PATENT DOCUMENTS 54-103058   8/1979  Japan ............................ 65/3.12
54-134721  10/1979  Japan ............................ 65/30.1

Primary Examiner—Richard V. Fisher
Attorney, Agent, or Firm—Sughrue, Mion, Zinn, Macpeak, and Seas

[57] ABSTRACT

A process for producing a preform for glass fiber for optical transmission by heating supply gases to form fine particles that are deposited on a rotating starter member to form an aggregate of fine glass particles which are then sintered to give a transparent vitreous material, characterized by a first heating stage wherein the aggregate of fine glass particles is sintered by increasing the temperature at a constant rate in a gaseous atmosphere which contains a halogen or halide and which has dehydrating activity, followed by holding the aggregate for a given period of time at a temperature in the range that causes considerable shrinkage of the aggregate, and a second heating stage where said aggregate is heated to the vitrifying temperature.

1 Claim, 5 Drawing Figures

PROCESS FOR PRODUCING A GLASS PREFORM FOR OPTICAL FIBER

BACKGROUND OF THE INVENTION

1. Field of the Invention

This invention relates to a process for producing a glass preform with minimum surface roughening and which has a minimum of impurities, residual water and air bubbles, and more particularly, to a process for producing a glass preform which contains not more than 0.1 ppm of residual water.

2. Description of the Prior Art

The VAD process that produces a glass preform for optical fiber by hydrolyzing halides of Si, Ge, B, P, etc., in an oxygen-hydrogen flame is considered effective for producing a silica-containing glass preform that is substantially free of impurities, particularly, transition metals such as Fe. The process is advantageous for preparing a preform for a cheap low-loss optical fiber having a desired distribution of refractive index in the radial direction and a uniform composition in both circumferential and longitudinal directions. The outline of the VAD process is as follows: Fine glass particles formed by flame hydrolysis and distributed within the flame according to their radial distance from the center are deposited in the axial direction on a rotating starting member such as a glass plate or rod to form a layer of glass soot in a cylindrical form which is then sintered to form a transparent preform. Among the advantages of this process are high yield, high purity (except for the residual OH), short production time (less than half that of other processes), easy control of refractive index distribution, and the very few steps required. Therefore, the process is considered suitable for quantity production and hence has a very great industrial value. However, the VAD process that relies on a hydrolytic reaction cannot be performed without having about 30 to 70 ppm of residual water that derives from part of the unreacted water.

In optical communications technology, that is an increasing demand to use waveforms in the vicinity of 1.3 $\mu$m where absorption loss due to incomplete structure of an optical fiber is minimum. But this is also a range in which absorption loss due to the presence of residual OH groups in the fiber is great. It is necessary to reduce the residual OH content of the fiber to less than 0.3 ppm in order to use this particular wavelength range. For this purpose, various physical or chemical treatments have been employed. Among physical methods of eliminating OH groups are hot air drying and vacuum drying. A known chemical method of eliminating OH groups uses a gaseous halide to decompose water in an aggregate of fine glass particles (to form a glass preform) into hydrogen halide and oxygen. It is difficult to reduce the residual OH content to less than 0.1 ppm by the physical method. The chemical method can only reduce the OH level to about 1 ppm even after a heat treatment at a temperature higher than 800° C., and an OH level on the order of 0.1 ppm is not achieved. Since the chemical method relies on HF, $Cl_2$, $SOCl_2$ gas and the like, the surface of the aggregate may be etched depending on the vitrifying conditions, and this can cause increased light loss due to the rough interface of the fiber. In addition, unless the concentration of the gaseous halogens or halide, the flow of carrier gas, and the temperature are properly selected, cracking occurs in the surface of the aggregate making it unsuitable for producing a fiber preform. Another problem is that transition metals which increase absorption loss or alkali or alkaline earth metals which reduce fiber strength may enter the fine glass particles in the halogen gas atmosphere through the tube in the center of the furnace.

SUMMARY OF THE INVENTION

The primary purpose of this invention is to provide an improved method of producing a glass preform for an optical fiber which uses a dehydrating halogen or halide gas to reduce the residual OH content to less than 0.1 ppm and avoids surface roughening of the resulting glass preform.

This purpose is achieved by a process of the type in which a preform for a glass fiber for optical transmission is produced by heating supply gases to form fine glass particles that are deposited on a rotating starting member to form an aggregate of fine glass particles which are then sintered to give a transparent vitreous element. The process is further characterized by a first heating stage wherein the aggregate of fine glass particles is sintered by increasing the temperature at a constant rate in a gaseous atmosphere which contains a halogen or halide and which has dehydrating activity, followed by holding the aggregate for a given period of time at a temperature in the range that causes considerable shrinking of the aggregate and a second heating stage where said aggregate is heated to the vitrifying temperature.

Other objects and features of this invention will become apparent by reading the following detailed description taken in conjunction with the accompanying drawings.

DETAILED DESCRIPTION OF THE INVENTION

The behavior of water within the aggregate of fine glass particles is described first. As is well known, water is adsorbed either physically or chemically, and chemical adsorption involves either weak chemical bond or strong chemical bond. Physically adsorbed water and water adsorbed by a weak chemical bond can be readily removed by heating to a temperature of at least 500° to 600° C. Elimination is further enhanced by using a dehydrating agent that prevents re-adsorption of the molecule of water. But if the heating period is too short, molecules of water may be occluded within a vitrified aggregate of glass particles to form a glass preform which has air bubbles or water dissolved therein. In any event, the heating temperature, time, type and concentration of dehydrating agent must be carefully selected.

OH groups adsorbed by a strong chemical bond cannot be simply removed by heating. To remove them, the surface of the glass particles must be activated with a dehydrating agent to liberate the OH group in the form of, for example, HCl and oxygen. Generally, the higher the temperature of the treatment with dehydrating agent and the higher the concentration of the agent, the greater its activity. But the dehydration of an aggregate of glass particles involves a different mechanism which is described below, and there is an optimum temperature range and concentration for treatment with dehydrating agent. The basic feature of this invention consists in discovering such optimum conditions for the two parameters.

Figure 1:
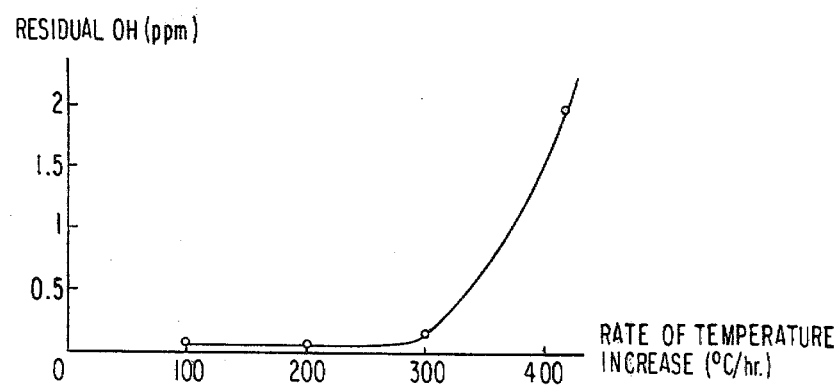
FIG. 1 is a graph showing the relation between the rate of temperature increase and residual OH level.

The interparticle growth of the aggregate of fine glass particles becomes vigorous at about 1,000° C. and as a result, heat shrinkage starts and the surface area of the aggregate decreases and inhibits dehydration. Therefore, to achieve maximum elimination of OH groups, the aggregate must be heated to an optimum temperature which is high enough to provide maximum activity for the dehydrating agent but which is in a range where interparticle growth does not inhibit dehydration. An optimum rate of temperature increase must be determined in such a manner that a good balance with heat shrinkage is obtained. Needless to say, these temperature conditions also depend upon the type and concentration of dehydrating agent used. Representative examples of dehydrating halogen or halide gas are $Cl_2$, $SOCl_2$, $CCl_4$ and $COCl_2$, preferably $SOCl_2$. By way of illustration, $SOCl_2$ is supplied as a dehydrating agent together with oxygen or an inert gas such as He, Ar and $N_2$, and is decomposed into $SO_x$ wherein x is 1, 2 or 3 and $Cl_2$ gases at a temperature of about 400° to 500° C. to which the aggregate of fine glass particles is exposed. The relation between the rate of temperature increase and the residual OH level as obtained in this instance is depicted in the graph of FIG. 1, from which one can see that if the rate of temperature increase is greater than 300° C./hr, the heat shrinkage of the aggregate of fine glass particles is accelerated and water is occluded within the aggregate and is difficult to eliminate from the aggregate. Accordingly, it is seen that in the first heating stage of this invention, the aggregate of fine glass particles must be sintered rather mildly by increasing the temperature at a rate of 300° C./hr or less, preferably 50° to 300° C./hr, to achieve not only interparticle growth but also dehydration. The rate of shrinkage also varies mainly depending upon the type and concentration of dopant used, and particle size of fine glass particles. The temperature is increased to a temperature at which it is held for a period of time and the aggregate shrinks.

Figure 2:
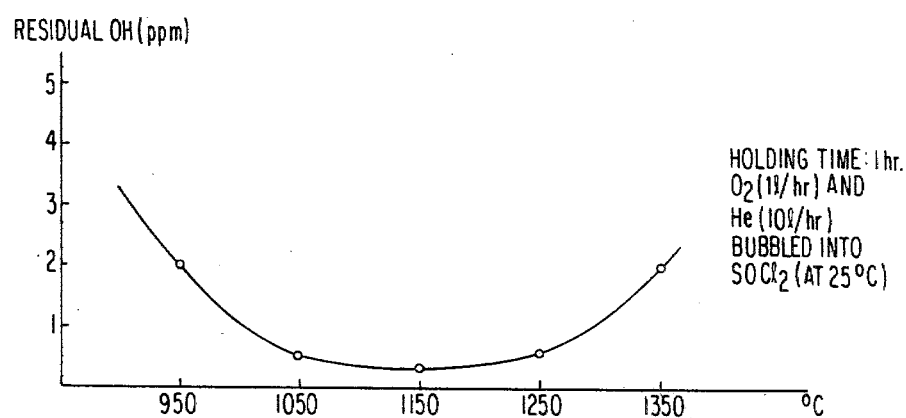
FIG. 2 is a graph showing the relation between the temperature at which the glass is held prior to vitrification and residual OH level for a 1 hour heat treatment.
Figure 5:
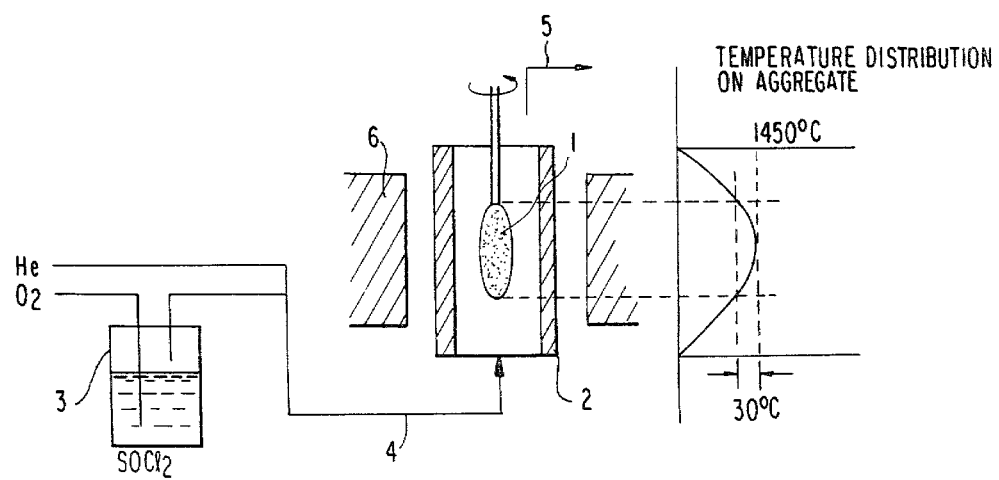
FIG. 5 is a conceptual diagram showing an outline of the apparatus to be used in the illustrated example of this invention.

The relation between residual OH level versus the temperature at which the aggregate of fine glass particles is held for a period of one hour after the start of sintering as determined using the apparatus shown in FIG. 5 is shown in the graph of FIG. 2. In this experiment, $O_2$ and He were bubbled into $SOCl_2$ at 25° C. at a rate of 1 liter/min. of $O_2$ and 10 liters/min. of He. It is apparent from FIG. 2 that the effect of OH elimination is the greatest in a temperature range between about 950° and 1,250° C. which is the highest optimum range for interparticle growth. Generally, the aggregate of fine glass particles is held at a temperature in the above range for a period of about 30 minutes whereby the residual OH level can be reduced to about 0.3 ppm which is practically satisfactory. However, if desired, the residual OH level can be further reduced when the aggregate is held for a longer period of time as shown in the table below, e.g., to as low as 0.02 ppm. When a temperature in this range is held for a period of time sufficient to reduce the residual OH level to less than about 0.3 ppm before it is increased to the vitrification temperature, no air or other impurities will be occluded within the aggregate being melted to form a vitreous material because individual fine glass particles are substantially free of OH groups. The effect of holding the aggregate of fine glass particles at a temperature within the defined range varies considerably with the period for which such temperature is held as indicated below.

| Minutes Held (at 1,100° C.) | 30 | 60 | 120 | 180 |
|---|---|---|---|---|
| Residual OH | 0.3 ppm | 0.1 ppm | 0.06 ppm | 0.02 ppm |

The gaseous dehydrating agent used in the present invention comprises 1 to 10 mol% of a halogen or halide in terms of $Cl_2$, less than 10 mol% of a gaseous absorbent such as $SO_x$ wherein x is 1, 2 or 3, $CO_2$ and the like and less than 10 mol% of oxygen, the balance being He, Ar, $N_2$ or a mixture thereof.

Figure 3:
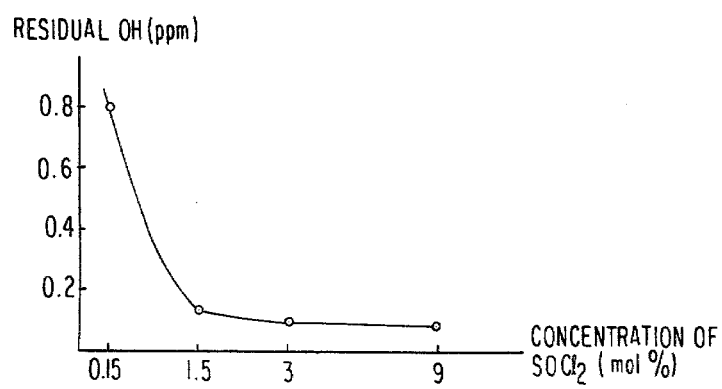
FIG. 3 is a graph showing the relation between the supply of dehydrating agent and residual OH level.

The concentration of a halogen or halide gas working as a dehydrating agent is now discussed. The relationship between the residual OH level and the concentration of $SOCl_2$ in the gaseous dehydrating agent comprising $SOCl_2/O_2$ and He supplied at a flow rate of about 10 liters/minute is set forth in the graph of FIG. 3, from which it is apparent that the upper limit of effect obtained by supplying dehydrating agent is about 1.5 mol% which corresponds to about 1 mol% in terms of $Cl_2$ content. The concentration of halogen or halide required varies depending upon the moisture content in the gaseous dehydrating agent (e.g., He, $O_2$ and $SOCl_2$), but, even with a gaseous dehydrating agent having high moisture content, a concentration of 10 mol% of halogen or halide in terms of $Cl_2$ is generally sufficient. Other dehydrating agents can also be used in a concentration corresponding to 1 to 10 mol% based on the amount of $Cl_2$.

The dehydrating agent reacts with not only OH groups but also glass at high temperatures. For instance, $Cl_2$ gas reacts with OH and $SiO_2$ as indicated by the following reaction scheme and as a result of its reaction with $SiO_2$, the surface of the glass is eroded.

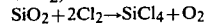

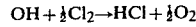

The erosion of glass surface is accelerated in the presence of a dopant such as Ge or B. Another possible problem is the formation of a cristobalite phase upon recrystallization of $SiCl_4$ and $O_2$. In this manner, the reaction between the glass preform and the dehydrating agent becomes vigorous at increased temperature to impair the surface of the preform. To avoid surface roughness, the dehydrating agent should be used in minimum amounts in the high temperature range. The effect of $SOCl_2$ on the etching of glass surface under various conditions is illustrated in Tables 1 and 2 below.

TABLE 1

Results of stopping the supply of dehydrating agent at various temperatures

|  | Sample 1 | Sample 2 | Sample 3 |
|---|---|---|---|
| Temperature at which $SOCl_2$ supply was stopped | 1,150° C. | 1,350° C. | 1,450° C. |
| Surface appearance | Smooth | Small degree of unevenness | Big crack 0.5 mm thick developed |

TABLE 2

Results of adding dehydrating agent up to 1,450° C.

|  | Sample 1 | Sample 2 | Sample 3 |
|---|---|---|---|
| $SOCl_2$ supply (mol%/min) | 0.15 | 1.5 | 4.5 |
| Surface appearance | Small degree of unevenness | Crack 0.1–0.2 mm thick developed | Crack 0.5 mm thick developed |

As Table 1 shows, the surface etching of the glass preform with a dehydrating agent takes place at temperatures of 1,350° C. or more, and as Table 2 demonstrates, the surface etching of the glass preform started when $SOCl_2$ was supplied at a concentration of 0.15 mol% in a temperature range up to 1,450° C.

From the foregoing observations, it is concluded that OH groups can be eliminated satisfactorily by maintaining the concentration of a dehydrating agent in a range of from about 1 to 10 mol% throughout the first heating stage and heating at a temperature less than 1,250° C. To substantially eliminate the use of a dehydrating agent to avoid etching of the surface of a glass preform at a temperature higher than about 1,250° C., it is preferred that almost all residual OH groups be eliminated before vitrifying at higher than 1,250° C. Since OH groups can be eliminated most effectively in a temperature range of from about 950° to 1,250° C., the process of this invention achieves substantial elimination of OH groups by holding a temperature within this range for a period of time such that there is substantially no need to use the dehydrating agent in the higher temperature range, thus meeting the above-described requirement of avoiding surface etching of the glass preform. Since not only OH groups but also inert gases such as He, $N_2$ and Ar as well as water entrained by $O_2$ must be removed from the glass preform, not more than 2 mol% of dehydrating agent can be supplied in a temperature range higher than 1,250° C. Therefore, 0 to 2 mol% of the dehydrating agent may be used in the temperature range higher than 1,250° C.

If the concentration of dehydrating agent is low, re-adsorption of water can be effectively prevented by masking the activated surface with $SO_x$, $CO_2$ or other absorbents that are more adsorptive than OH group. In Table 3 below, the effect of $SO_x$-containing dehydrating agents to remove the OH group is compared with that of an equimolar amount of chlorine.

TABLE 3

|  | Chlorine | $SOCl_2/O_2$ |
|---|---|---|
| Residual OH level (ppm) | 0.5 | 0.1 |

Table 3 clearly shows that the dehydrating agent containing $SO_x$ removes OH groups far more effectively than $Cl_2$ used alone. This is perhaps because $SO_x$ is adsorbed on sites from which OH groups are removed and prevents re-adsorption of the OH groups on those sites.

As described hereinabove, the method of this invention can be combined with the VAD process to produce a glass preform in which residual OH is appreciably reduced. In the foregoing description, $SOCl_2$ was used as a dehydrating agent, but the same result is obtained using a mixture of $Cl_2$ gas and $SO_2$ gas. The method can also be combined with other basic process for producing a glass preform which permit heat treatment and controlling the concentration of the dehydrating agent accomplished in this invention.

Figure 4:
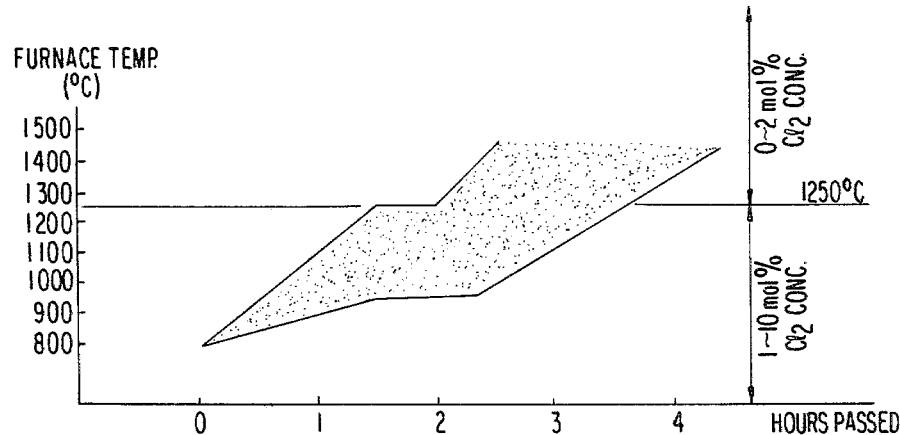
FIG. 4 is a chart illustrating how temperature and the concentration of dehydrating agent are controlled over time according to this invention.

FIG. 4 graphically shows how the temperature and the concentration of dehydrating agent are controlled over time in accordance with this invention.

The second heating stage where the aggregate is heated to the vitrifying temperature can be conducted in a conventional manner by increasing the temperature from the temperature at which the aggregate is held, i.e., in the range of 950° to 1,250° C., to a vitrifying temperature in the range of about 1,450° to 1,550° C. at a rate of less than about 500° C., preferably 100° to 500° C., per hour.

This invention is now described in greater detail by reference to the following example which is given here for illustrative purposes only and is by no means intended to limit the scope of the invention.

EXAMPLE

As shown in FIG. 5, a columnar aggregate 1 of fine silica particles (60 mm$\phi$, 300 liters) was placed in an alumina muffle tube 2 (ID: 80 mm, 1,000 liters) in a heating furnace 6 and heated while rotating at 2 to 3 rpm. 0.5 liter/minute of $O_2$ was bubbled into $SOCl_2$ (25° C.) in a bubbler 3 and the mixture was combined with 10 liters/minute of He gas. The resulting gaseous dehydrating agent was supplied to the furnace 6 through a pipe 4 when the furnace temperature reached 800° C., and as the agent was discharged from the furnace through a pipe 5, the temperature in the furnace was increased to 1,100° C. at a rate of 150° C./hr and that temperature was held for one hour. The supply of $SOCl_2/O_2$ was then stopped, and the furnace temperature was elevated to 1,450° C. at a rate of 200° C./hr while only He gas was supplied. The resulting glass preform contained 0.05 ppm residual OH.

While the invention has been described in detail and with reference to specific embodiments thereof, it will be apparent to one skilled in the art that various changes and modifications can be made therein without departing from the spirit and scope thereof.

What is claimed is:

1. A process for producing a preform for glass fiber for optical transmission by heating supply gases to form fine glass particles that are deposited on a rotating starter member to form an aggregate of fine glass particles which are then sintered to give a transparent vitreous material, characterized by a first stage wherein the aggregate of fine glass particles is sintered in a gaseous atmosphere which contains a halogen or halide at a concentration of 1 to 10 mol% and which has dehydrating activity as the temperature is increased at a constant rate of 300° C./hr or less, followed by a period of time during which the aggregate is held at a temperature between about 950° C. and 1250° C. for at least 30 minutes that causes considerable shrinking of the aggregate and wherein the concentration of said halogen or halide is maintained at 1 to 10 mol%, and a second heating stage where said aggregate is heated to the virtrifying temperature during which second heating stage the concentration of said halogen or halide is reduced to 0 to 2% at a temperature above 1250° C.

* * * * *